United States Patent [19]
Schulz et al.

[11] 3,954,885
[45] May 4, 1976

[54] INCREASING THE MOLECULAR WEIGHT OF LIQUID LINEAR BUTADIENE DEAD POLYMERS EMPLOYING P-TOLUENE SULFONIC ACID AS ACID CATALYST

[75] Inventors: Donald Norman Schulz, Hartville; John Norton Anderson, Tallmadge, both of Ohio

[73] Assignee: The Firestone Tire & Rubber Company, Akron, Ohio

[22] Filed: Dec. 13, 1974

[21] Appl. No.: 532,555

[52] U.S. Cl. .................. 260/615 A; 260/614 A; 526/22.55; 526/225; 526/335
[51] Int. Cl.² .............. C07C 47/10; C08F 116/12; C08F 6/00; C08F 136/02
[58] Field of Search .................. 260/94.7 R, 94.7 S, 260/94.4, 94.2 R, 614 A, 615 A, 91.1 R, 91.1 S

[56] References Cited
UNITED STATES PATENTS

| | | |
|---|---|---|
| 3,551,394 | 12/1970 | Sakuragi .................. 260/94.7 S X |
| 3,578,627 | 5/1971 | Boutsicaris .................. 260/94.4 |
| 3,657,206 | 4/1972 | Halasa .................. 260/94.7 R X |
| 3,692,874 | 9/1972 | Farrar et al. .................. 260/94.7 S |
| 3,737,421 | 6/1973 | Halasa .................. 260/94.7 R |

OTHER PUBLICATIONS

Schulz et al., *J. Polymer Science* Vol. 12, pp. 153–166 (1974), "Anionic Polymerization Initiators Cont Protected Functional Groups and Functionally Terminated Diene Polymers".

Nakajima "Fractionation of Linear Polyethylene" pp. 98–107 *Advances in Chemistry* Series No. 125 ACS Wash. D.C. 1973.

*Primary Examiner*—Joseph L. Schofer
*Assistant Examiner*—Herbert J. Lilling

[57] ABSTRACT

The molecular weight of a liquid, linear dead polymer terminated with an alpha-alkoxyalkyl ether group, is increased by heating with an acid catalyst in the absence of a solvent.

4 Claims, 1 Drawing Figure

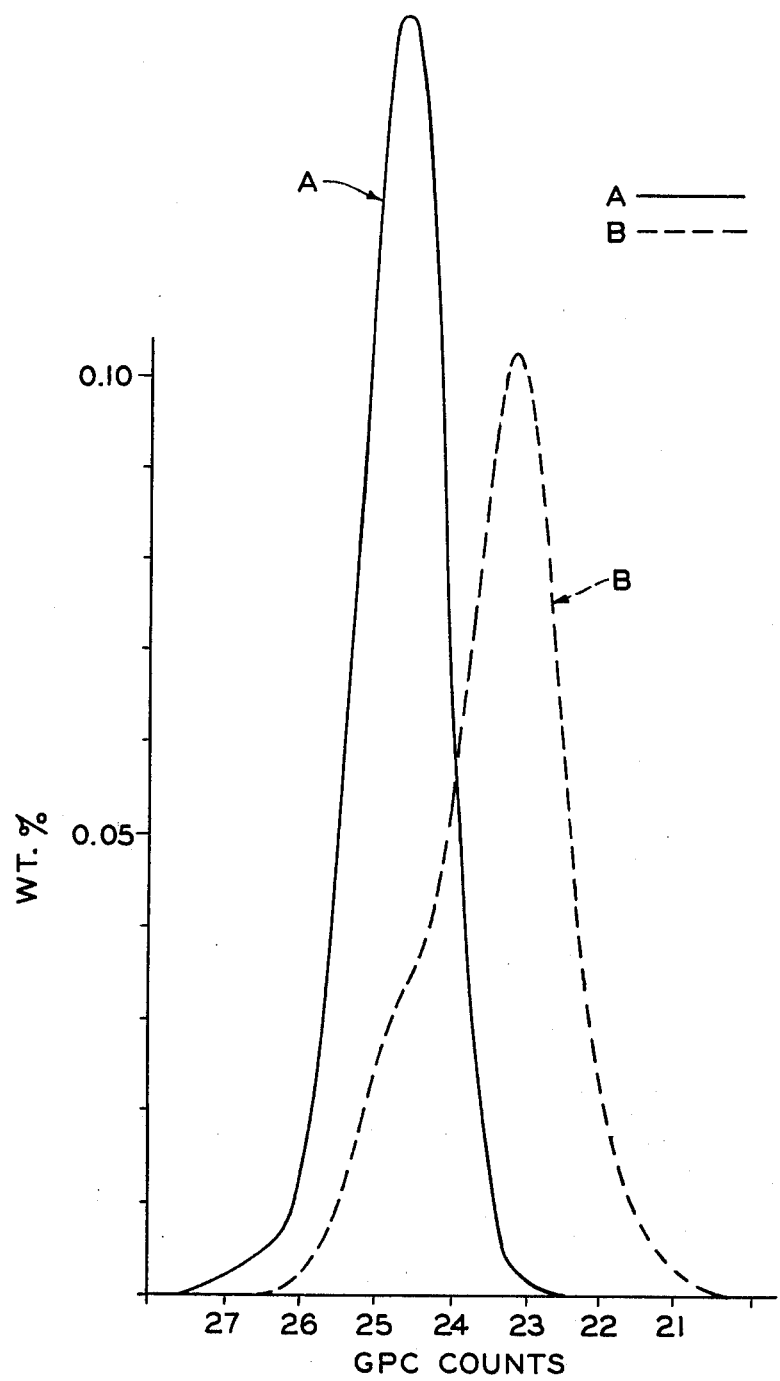

INCREASING THE MOLECULAR WEIGHT OF LIQUID LINEAR BUTADIENE DEAD POLYMERS EMPLOYING P-TOLUENE SULFONIC ACID AS ACID CATALYST

PRIOR ART

"Anionic Polymerization Initiators Containing Protected Functional Groups and Functionally Terminated Diene Polymers" by Schulz et al. in 12 *Journal of Polymer Science*, pages 153–166 (1974) describes the preparation of polymers terminated at one end with an alpha alkoxyalkyl ether group and at the other end with hydrogen or an hydroxyl group.

"Induced Changes in the Molecular Weight of Polybutadiene Using Alkyllithium-Alkyl Halide Complexes" by Halasa and Adams in 30 *Journal of Polymer Science*, Part C, pages 169–180 (1970) describes coupling of dead polymers but requires external jumping (coupling) agents, and produces cross-linked polymers.

U.S. Pat. Nos. 3,668,279 and 3,639,679 disclose the coupling of live polymers. U.S. Pat. No. 3,657,206 discloses the coupling of dead polymers with an alkyl halide and a halogen-containing coupling agent.

SUMMARY OF THE INVENTION

Surprisingly, it has been found that liquid, dead linear polybutadiene or other polymer terminated at one end with an alpha-alkoxyalkyl ether group (i.e. an hydroxyl-carrying acetal group) and at the other end with hydrogen or an hydroxyl group, undergoes coupling when heated with an acid catalyst in the substantial absence of solvent. The polymer is coupled without any substantial cross-linking.

An alpha-alkoxyalkyl ether group, i.e. an acetal group which is an hydroxyl carrier is represented by the following:

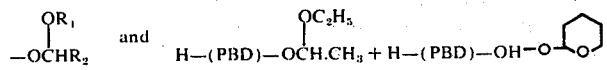

may be used. In the two foregoing formulae $R_1$ is hydrogen or an alkyl group containing 1 to 5 or more carbon atoms and $R_2$ is an alkyl group containing 1 to 5 or more carbon atoms.

Although the preferred polymers are polybutadiene, there is no reason to suppose that the process is not applicable to the treatment of all liquid hydrocarbon polymers which are terminated at one end with an alpha-alkoxyalkyl ether group and at the other end with hydrogen or hydroxyl. The polybutadiene which is treated is linear and may have a molecular weight $M_n$(GPC) from 200 up to about 10,000.

Any acid coupling catalyst may be employed as, for example, hydrochloric acid, methane sulfonic acid, dichloroacetic acid, etc., para-toluene sulfonic acid in methanol, hexane or other suitable solvent being preferred. The catalyst must be soluble or dispersible in the polymer or a solution of the catalyst may be used, the solvent being stripped from the polymer after incorporation therein.

The reaction is carried out at an elevated temperature such as 50° to 100° C. and preferably at about 50° to 60° C.

At one end of the polymer which is to be coupled is a alpha-alkoxyalkyl ether group, preferably

in which $R_1$ is hydrogen or an alkyl group containing 1 to 5 or more carbon atoms and $R_2$ is an alkyl group containing 1 to 5 or more carbon atoms. At the other end of the polymer is hydrogen or a hydroxyl group. If one terminal is ether, heating causes hydrolysis of the ether group to a hydroxyl group. (Schulz et al., supra.) This is the reaction (Equation I, below) that takes place in solution. (Schulz et al., supra.) In the absence of any substantial amount of solvent, the claimed bulk reaction takes place in which hydroxyl-terminated polymer couples with ether-terminated polymer to produce polymer of increased molecular weight. These doubling reactions are illustrated by the following equations II to IV.

SOLUTION REACTION

The PBD represent polybutadiene or other liquid polymer.

Equation I

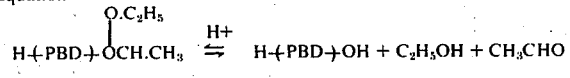

Bulk Reactions

Equation II

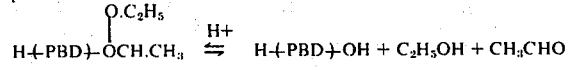

Equation III

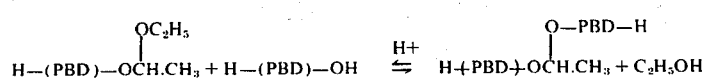

Equation IV

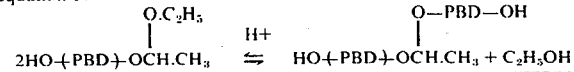

EXPERIMENTAL

Liquid linear butadiene polymer terminated at one end with an alpha-alkoxyalkyl ether group was hydrolyzed in solution, as disclosed in the aforesaid Schulz et al. article, in a 75/25 toluene water solution using 1 gram of $Cl_2CH.COOH$ per 100 grams of polymer per 500 milliliters of solvent. The mixture was refluxed over night or until there was no change in the OH-region ($2.75-2.9\mu$) or in the C—O—C region ($8.9-9.0\mu$) of the infrared spectrum of the reaction mixture. The reaction and production of hydrolyzed polymer is illustrated by Example 1.

EXAMPLE 1

Three runs were made with polybutadienes of 6656, 7276 and 5973 molecular weight, respectively. The product $M_w/M_n$ was 1.06 for each, and the meq/gm of OH was 0.29, 0.28 and 0.31, respectively. In each case the theoretical hydroxyl functionality was 2.0, and the experimental functionality was 1.93, 2.04 and 1.85, respectively. The GPC curves showed no coupling.

The process is illustrated by Equation I.

EXAMPLES 2, 3 AND 4

As contrasted with the solution reaction of Example 1, these reactions were carried out in the substantial absence of solvent.

The liquid polybutadienes used in Examples 2, 3 and 4 were terminated at one end by an alkoxyalkyl ether group. In Examples 2 and 3, the other end of the polymer terminated in hydrogen.

In Example 2, a few crystals of p-toluene sulfonic acid, dissolved in hexane/methanol, were dispersed in a hexane solution of 30 gms of ether-terminated polymer. The solvent was removed under reduced pressure in a Rotovac to leave a dispersion of p-toluene sulfonic acid in the bulk ether-terminated polymer. Heating to 50° C. for 72 hours coupled the polymer.

In Example 3, aqueous HCl (100 ml of 2N) was dispersed in the polymer solution containing 45 gms of polymer. Removal of the solvent in a Rotovac left the bulk polymer with dispersed HCl catalyst. Heating the bulk polymer with catalyst for 48 hours at 50° C. resulted in the coupled polymer.

The polymer began to hydrolyze in the bulk, forming hydroxyl as illustrated by Equation II, and then the polymers self-condensed as illustrated in Equation III.

In Example 4, the procedure was similar to that in Example 2, using a few crystals of p-toluene sulfonic acid, heating at 50° C. for 98 hours. The hydroxyl end of one chain coupled with the ether end of another chain as illustrated in Equation IV.

The GPC trace of each polymer product was bimodal. Other factors are recorded in the table which follows:

| Example | $\overline{M}_w/\overline{M}_n$ | OH meq./gm | F(OH) Theory | F(OH) Exper. | % Coupling (GPC) |
|---|---|---|---|---|---|
| 2 | 1.14 | 0.035 | 1.0 | 0.17 | 80% |
| 3 | 1.16 | 0.101 | 1.0 | 0.49 | 50% |
| 4 | 1.11 | 0.29 | 2.0 | 1.67 | 36% |

The drawing shows gel-permeation chromatograms of A the base polymer before hydrolysis in bulk and B the polymer after hydrolysis in bulk, produced as described in Example 2. For partially coupled polymers, one would expect a bimodal molecular weight distribution, and the uncoupled polymers would elute at count values corresponding to elution volumes observed for the base polymer. Curve B shows that hydrolysis of the ether-terminated polymer in bulk results in the formation of a polymer of high molecular weight and a bimodal molecular weight distribution. The GPC count at the peak maximum of the hydrolyzed polymer corresponds to a number average molecular weight approximately twice the molecular weight value of the base polymer. A low molecular weight shoulder is observed on the chromatogram of the hydrolyzed polymer corresponding to GPC elution volumes observed for the polymer before hydrolysis. This indicates that a significant portion of the polymer is jointed during hydrolysis to form a polymer of high molecular weight.

The per cent coupling (GPC) values in Table on page 7 were calculated in the following manner:

To determine the per cent coupling, the ratio of normalized peak heights of chromatogram B to chromatogram A at 0.2 count intervals, starting at the high values of GPC count, are calculated. These values should be constant values at elution volumes corresponding to elution volumes of the uncoupled polymer providing that the uncoupled polymer peak does not overlap with the peak of the coupled polymer. As one proceeds to lower GPC count values, peak overlap becomes predominant and one sees a variation in the ratio of the peak heights. In addition, variations in the ratio at the low molecular weight (high GPC counts) extremes of the chromatograms are frequently observed which are due to experimental error. However, in the low molecular-weight portions of the chromatograms (large GPC count values) there is a region of GPC counts where this ratio is constant since overlap is negligible and the peak height values are more accurate. This constant ratio is the weight fraction of uncoupled polymer, and the fraction of coupled polymer is equal to one minus the fraction of uncoupled polymer.

We claim:
1. The process of linearly doubling the molecular weight of a liquid linear polybutadiene with a molecular weight of 200 to 10,000, which polybutadiene is terminated at one end with an alpha-alkoxyalkyl ether group and at the other end with hydrogen or hydroxyl, which process comprises heating said polybutadiene at substantially 50° to 100° C. in the substantial absence of solvent and in the presence of a dispersible or soluble acid coupling catalyst until a significant portion of the polymer chains have coupled to double their molecular weight.

2. The process of claim 1 carried out at 50° to 60° C.

3. The process of claim 1 in which p-toluene sulfonic acid is the catalyst.

4. The process of claim 1 in which the ether-terminated group is alpha-ethoxyethylether.

* * * * *